United States Patent [19]
Brown et al.

[11] 3,842,676
[45] Oct. 22, 1974

[54] ALTITUDE COMPUTER APPARATUS

[75] Inventors: Charles H. Brown; Robert W. Robinson, both of Phoenix, Ariz.

[73] Assignee: Sperry Rand Corporation, New York, N.Y.

[22] Filed: May 3, 1973

[21] Appl. No.: 357,056

Related U.S. Application Data

[63] Continuation-in-part of Ser. No. 104,374, Jan. 6, 1971, abandoned.

[52] U.S. Cl. ............................... 73/384, 73/398 R
[51] Int. Cl. ............................ G01l 7/08, G01l 9/10
[58] Field of Search.......... 73/384, 386, 387, 398 R, 73/398 C, 179

[56] References Cited
UNITED STATES PATENTS
3,503,263   3/1970   Intraub............................ 73/398 R

*Primary Examiner*—Donald O. Woodiel
*Attorney, Agent, or Firm*—Howard P. Terry; Thomas J. Scott

[57] ABSTRACT

An apparatus including a pressure sensing device in combination with a frequency converter, a displacement servo and a transducer in which the pressure sensing device incorporates a vibrating sensitive diaphragm in combination with an electrical drive circuit and a variable frequency oscillator for producing output voltages having frequencies which vary in a substantially linear manner with respect to pressure altitude. The frequency converter is coupled to the pressure sensing device and has a substantially linear transfer characteristic of variable frequency input with respect to amplitude of voltage output for transforming the variable frequency electrical output signal from the pressure sensing device into a variable amplitude output voltage that is applied to the displacement servo which provides an output shaft angle displacement. The transducer is coupled through appropriate gearing to the displacement servo which produces an output electrical signal in response to the output shaft angle displacement that is linearly proportional to the pressure altitude.

7 Claims, 5 Drawing Figures

INVENTORS
CHARLES H. BROWN
ROBERT W. ROBINSON
BY

ATTORNEY

ALTITUDE COMPUTER APPARATUS

CROSS-REFERENCE TO RELATED APPLICATION

This is a continuation-in-part of application Ser. No. 104,374, filed Jan. 6, 1971, now abandoned.

BACKGROUND OF THE INVENTION

1. Field of the Invention

The subject invention pertains to pressure measuring devices and specifically to apparatus for determining pressure altitude.

2. Description of the Prior Art

In the prior art, instruments which provide aircraft data as a function of pressure usually employ an aneroid pressure responsive capsule or bellows in a mechanically balanced system. One such system which determines altitude as a function of pressure employs a torsion bar with an applied torque disposed between two links under tension. The first of the two links has the end opposite the torsion bar fixedly mounted with respect to the aircraft while the second link has the end opposite the torsion bar connected to the capsule. An electrical pick-off device such as an E-transformer has its output coupled through an amplifier to a motor which has its armature coupled to a tachometer generator and the torsion bar. In operation, the pressure capsule is evacuated and responsive to the pressure variations of the static pressure caused by changes in altitude experienced by the aircraft. As the aircraft altitude is increased, the bellows expand applying a force to the attached link which decreases the tension in that link. The torsion bar tends to untwist creating an unbalanced condition in the system. The electrical pick-off device senses the displacement of the torsion bar and generates an error signal which is amplified and applied to the motor. The motor armature rotates producing a feedback signal in the tachometer generator that is fed back to the pick-off device thereby reducing the error signal. The rotating armature also rotates the torsion bar restoring the system to a balanced condition. In addition, the motor armature is coupled through appropriate gearing to an indicating instrument that provides a visual readout of aircraft altitude. The feedback servo loop is subject to inaccuracies due to the mechanical force balancing and torque summing required to compute the altitude. Additionally, the E-transformer pick-off and the error signal amplifier contribute gain instabilities which must be compensated.

SUMMARY OF THE INVENTION

The subject invention includes a pressure sensing device such as the pressure sensitive diaphragm as disclosed in U.S. Pat. No. 3,456,508, issued July 22, 1969 in the name of Richard H. Frische for Vibrating Diaphragm Pressure Sensor Apparatus and assigned to the present assignee. This diaphragm apparatus may be used as a measuring instrument of differential pressure by filling chambers on each side of the diaphragm with the pressures for which a pressure differential is to be determined, for example, static pressure and total pressure when obtaining air speed. Alternatively the measurement of differential pressure obtained will be a measure of absolute pressure if the chamber on one side of the diaphragm is sealed and evacuated and a second chamber is filled with the air pressure to be measured with respect to the vacuum on the other side of the diaphragm.

As taught in the referenced U.S. Pat. No. 3,456,508, the varying stiffness of the pressure sensitive diaphragm provides a variable mechanical resonant frequency that is coupled into an electronic oscillator and controls the resonant frequency of the oscillator. A unique characteristic of this device is that it produces a variable frequency output that is substantially linear over a wide range of pressure altitudes.

Combining this pressure sensitive device with a frequency to d.c. converter having a substantially linear characteristic provides a highly accurate analog device which provides a variable amplitude d.c. output voltage that is a linear function of the pressure altitude. The operating range of this combination of components is found to have special application in aircraft where accurate altitude indications may be provided in instruments that are much more economical than those currently available.

A displacement servo coupled to the converter produces an output shaft angle displacement in response to the output d.c. voltage and transducers responsive to the shaft angle displacement provide coarse and fine electrical output signals for corresponding altitude indicator instruments. Thus, the subject invention eliminates the mechanical force balancing and torque summing required to compute altitude in the prior art device.

DESCRIPTION OF THE PREFERRED EMBODIMENT

Figure 1:
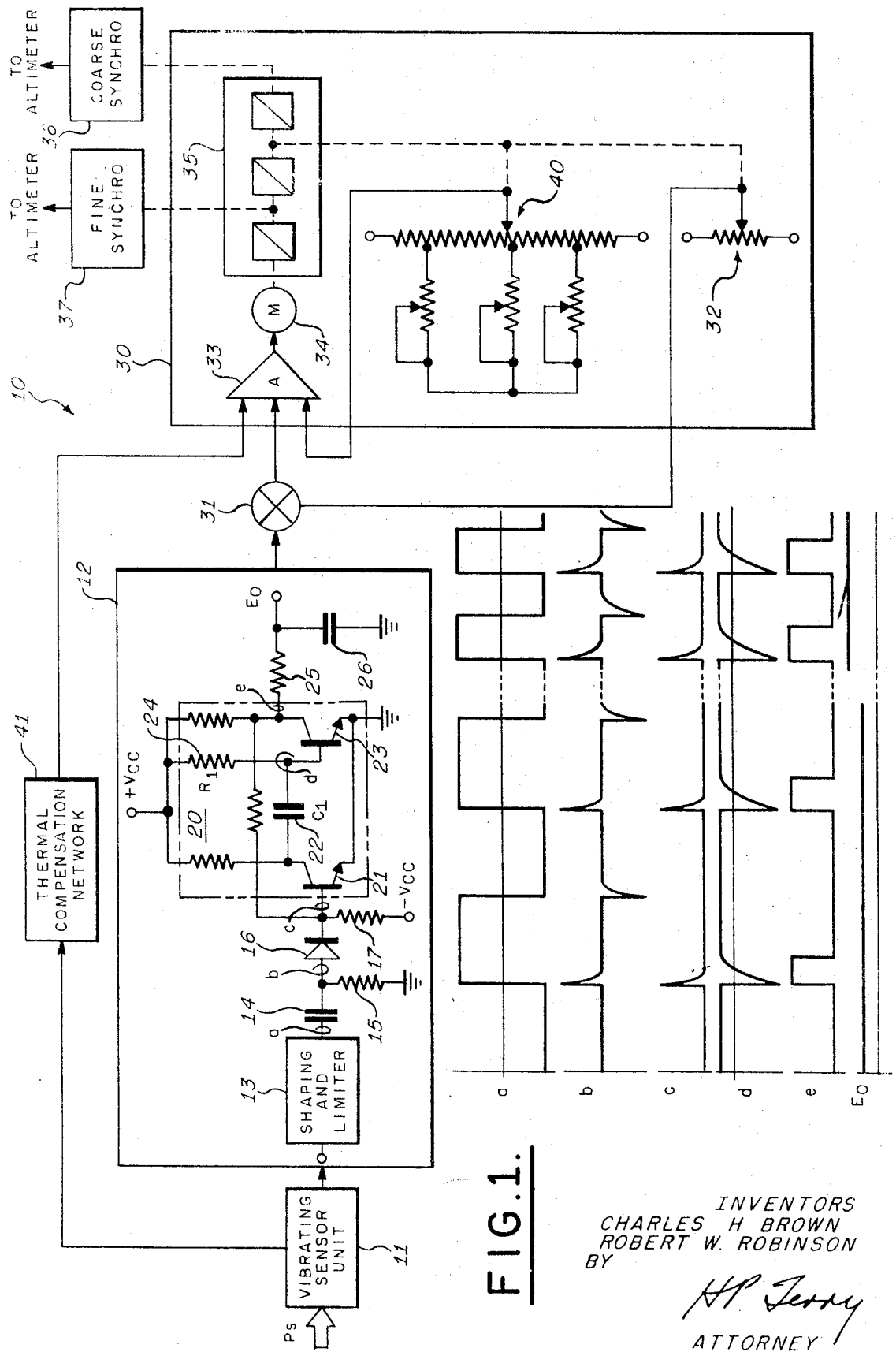
FIG. 1 is a block diagram of an altitude computer incorporating the invention.

The invention will be described with reference to the block diagram in FIG. 1 which shows the combination incorporated in an altitude computer 10. The specific configuration of the altitude computer 10 shown is used to indicate altitude in accordance with pressure altitude, H, which is a function of the differential pressure, P, determined from static pressure, $P_s$, and a reference pressure, $P_r$, when the reference pressure is vacuum pressure.

The altitude computer 10 includes a vibrating sensor unit 11 as disclosed in the aforementioned U.S. Pat. No. 3,456,508 which measures the static pressure, $P_s$, referenced to a vacuum and will be described in greater detail with respect to FIGS. 2 and 3. It will be noted that the transfer characteristic of the vibrating sensor unit as shown in FIG. 3 in U.S. Pat. No. 3,456,508 is non-linear for changes in frequency with respect to changes in pressure. However, it is well known that atmospheric static pressure, $P_s$, is a non-linear function of pressure altitude, H, as will be more fully described below with respect to equation (6).

In combining the transfer function of the vibrating pressure sensor unit as shown in FIG. 3 of U.S. Pat. No. 3,456,508 with the non-linear function of atmospheric static pressure, $P_s$, with respect to pressure altitude, H, it has been found that the vibrating sensor unit 11 has a substantially linear transfer characteristic of frequency, $f$, with respect to pressure altitude, H.

The output of the vibrating sensor unit 11 is applied to a frequency to d.c. converter 12 which has a substantially linear characteristic of frequency input with respect to amplitude of d.c. output voltage. As shown in FIG. 1, the converter 12 may include a shaping and limiter circuit 13 coupled through differentiating and clipping circuits comprised of a capacitor 14, a resistor 15, a diode 16 and a negatively biased resistor 17 to the monostable multivibrator 20. The multivibrator 20 includes a normally non-conducting transistor 21 coupled through a capacitor 22 to a normally conducting transistor 23. The switching rate of the multivibrator is controlled by the time constant of the capacitor 22 and a resistor 24. An integrating circuit including a resistor 25 and a capacitor 26 couple the output of the multivibrator 20 to a displacement servo 30. The displacement servo 30 includes a summing element 31 which may be simply a two resistor input circuit that has its first input terminal connected to the junction of the resistor 25 and the capacitor 26. The second input terminal of the summing element 31 is coupled to the wiper arm of a feedback potentiometer 32. An operational amplifier 33 which is connected to the output terminal of the summing element 31 produces a d.c. output voltage that controls a d.c. motor 34. The armature of the d.c. motor 34 is coupled to a variable gain gear train 35 which angularly displaces the rotors of a coarse synchro 36 and a fine synchro 37. Additionally, the gear train 35 positions the wiper arms on the feedback potentiometer 32 and a calibration potentiometer 40. The electrical signal outputs from the coarse synchro 36 and the fine synchro 37 are coupled to an indicating altimeter as noted by the legend. A thermal compensation network 41 receives an input signal from the vibrating sensing unit 11 and produces an output signal which is coupled into the operational amplifier 33.

Figure 2:
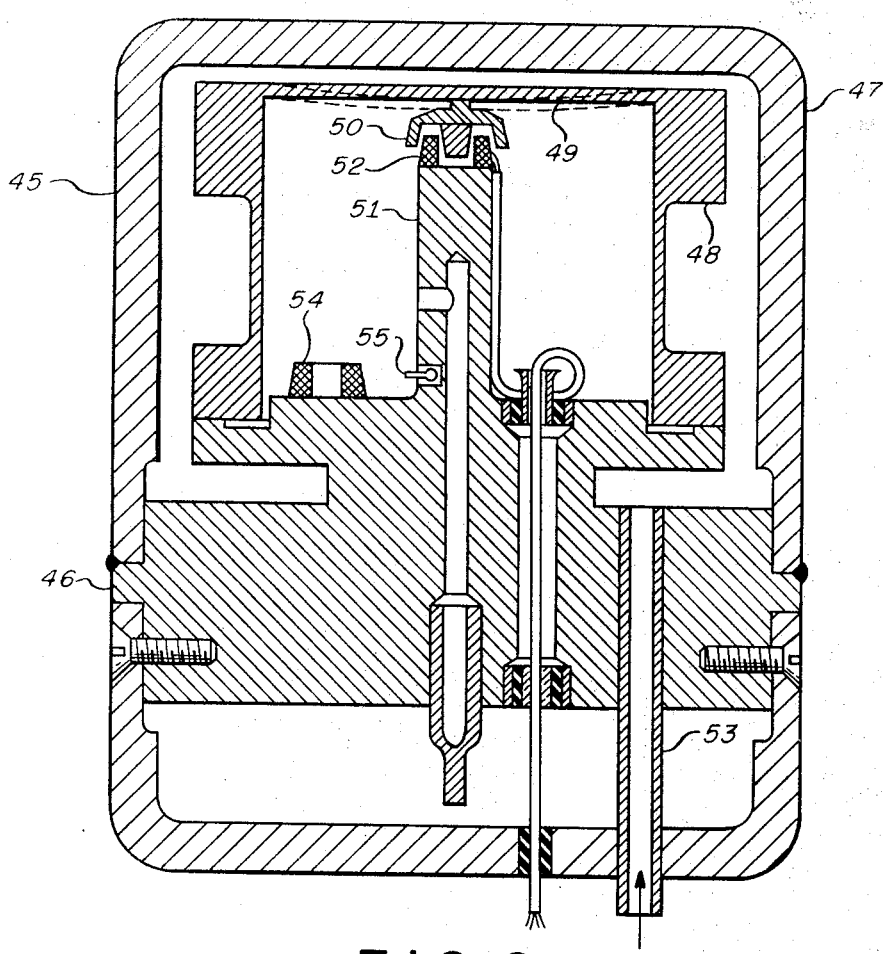
FIG. 2 is a sectional view of a vibrating diaphragm sensor unit incorporated in the present invention.
Figure 3:
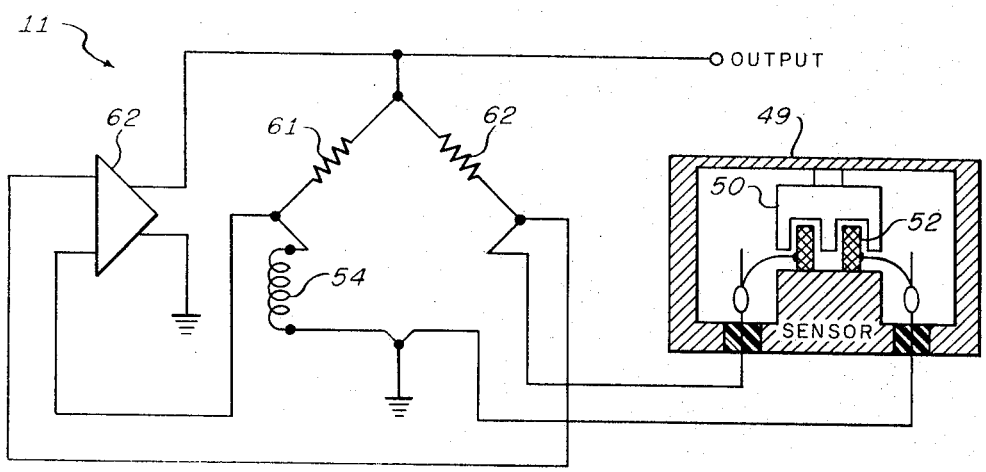
FIG. 3 is a schematic diagram of a pressure sensitive diaphragm Wheatstone bridge and amplifier connected to form a simple tuned oscillator.

The following detailed description of a vibrating diaphragm pressure sensor 45 disposed within the vibrating sensor unit 11 is presented with reference to FIG. 2. A base section 46 supports a hollow cylindrical cover 47 to which it is secured in an airtight manner. The base section 46 also supports a hollow tubular section 48 which has a circular flat resilient metallic diaphragm 49 and is also secured to the base 46 in an airtight manner. A magnet assembly 50 is securely attached to the underside of the diaphragm 49. The base 46 has a cantilevered post 51 centrally located with respect to the sides of the hollow tubular section 48. Affixed to the top of the post 51 is a coil 52 in cooperative coaxial relation with the magnet assembly 50. The coil 52 forms one leg of a Wheatstone bridge which will be described below. An access tube 53 allows the static pressure Ps to enter a first chamber as defined by the interior of the hollow tubular section 48 and the base section 46.

During assembly of the sensor 45, a second chamber defined by the exterior of the hollow tubular section 48 and the interior of the hollow cylindrical cover 47 is evacuated to form a vacuum chamber. As static pressure is admitted into the first chamber through access tube 53, the diaphragm 49 is bent or deformed becoming stiffer as it is deflected from its flat or unstressed condition. It is this property of varying stiffness that causes the natural resonant frequency of the pressure sensor 45 to vary with pressure.

A dummy coil 54 which forms a second leg of the Wheatstone bridge is mounted within the sensor 45 and is subjected to essentially the same environment as the coil 52. Further, embedded at the base of the cantilevered post 51 is a thermistor 55 which senses variations in temperature within the sensor 45 and provides an electrical signal that is coupled into the thermal compensation network 41 shown in FIG. 1.

In the vibrating sensor unit 11 shown schematically in FIG. 3, the coil 52 is shown connected as one leg of the Wheatstone bridge circuit 60 and the dummy coil 54 is shown as the second leg. A pair of resistors 61 and 62 are connected to form the remaining two legs of the bridge circuit 60. An unbalance in the circuit 60 resulting from the back EMF of the coil 52 produces a variable frequency output signal which is substantially a linear function of pressure altitude. The amplitude of the output signal is increased in the amplifier 62 and fed back into the bridge circuit 60 prior to being coupled into the frequency to d.c. converter 12 of FIG. 1.

The frequency of the diaphragm 49 is a function of the effective mass of the diaphragm M, and the diaphragm force spring rate, $K_f$, and is expressed:

$$f = 1/2\pi \sqrt{k_f/M} \tag{1}$$

The effective mass of the diaphragm is a function of the diaphragm radius, $b$ (inches), thickness, $h$ (inches), density of mass material, $\rho$ (grams/in$^3$) and the mass of the magnet assembly 40, Mm (grams) given as:

$$M = 4.096766 \ \pi b^2 \ h \ \rho + Mm \tag{2}$$

The diaphragm force spring rate, $k_f$, is:

$$k_f = 175126.77 \ \pi E \ h^3/b^2 \ [1.4652 + 32.585 \ \delta^2/h^{1/3} \tag{3}$$

where E = diaphragm modulus of elasticity (lbs/in$^2$)

where $\delta$ = diaphragm deflection (inches)

The deflection of the diaphragm is given by the following expression:

$$\delta = [-DP/2 + ((DP)^2/4 + C^2/27)^{1/2}]^{1/3} + + [-DP/2 - ((DP)^2/4 + C^3/27)^{1/2}]^{1/3} \tag{4}$$

where $D = -.29 \ b^4/Eh$ $$C = 1.5473 \ h^2/1 - \nu^2$$

$\nu$ is Poisson's ratio for the diaphragm material and P is the pressure (lbs/in$^2$).

A close approximation of the pressure, P, as a function of altitude is given by the expression:

$$P \approx 14.696 \ (145447 - H/145447) \ 5.25624 \tag{5}$$

where H is the pressure altitude (feet).

The expression for frequency $f$, as a function of pressure altitude, $H$, is obtained by substituting equation (5) into equation (4); equation (4) into equation (3); and equations (2) and (3) into equation (1). The resulting complicated expression has been observed to be a substantially linear function of the type $f = mH$ for the vibrating sensor 11 in which m is the slope of the transfer characteristic. Further, by combining the sensor 11 with the converter 12 provides an output with better linearity because the non-linearities in the converter 12 compensate those present in the sensor 11. Since it is much simpler to control the component values in the converter 12 than the physical parameters in the sensor 11, optimum linearity is obtained by first determining the transfer characteristic of the sensor 11 and using component values in the converter 12 which will provide the most linear output from the combination.

Figure 4:
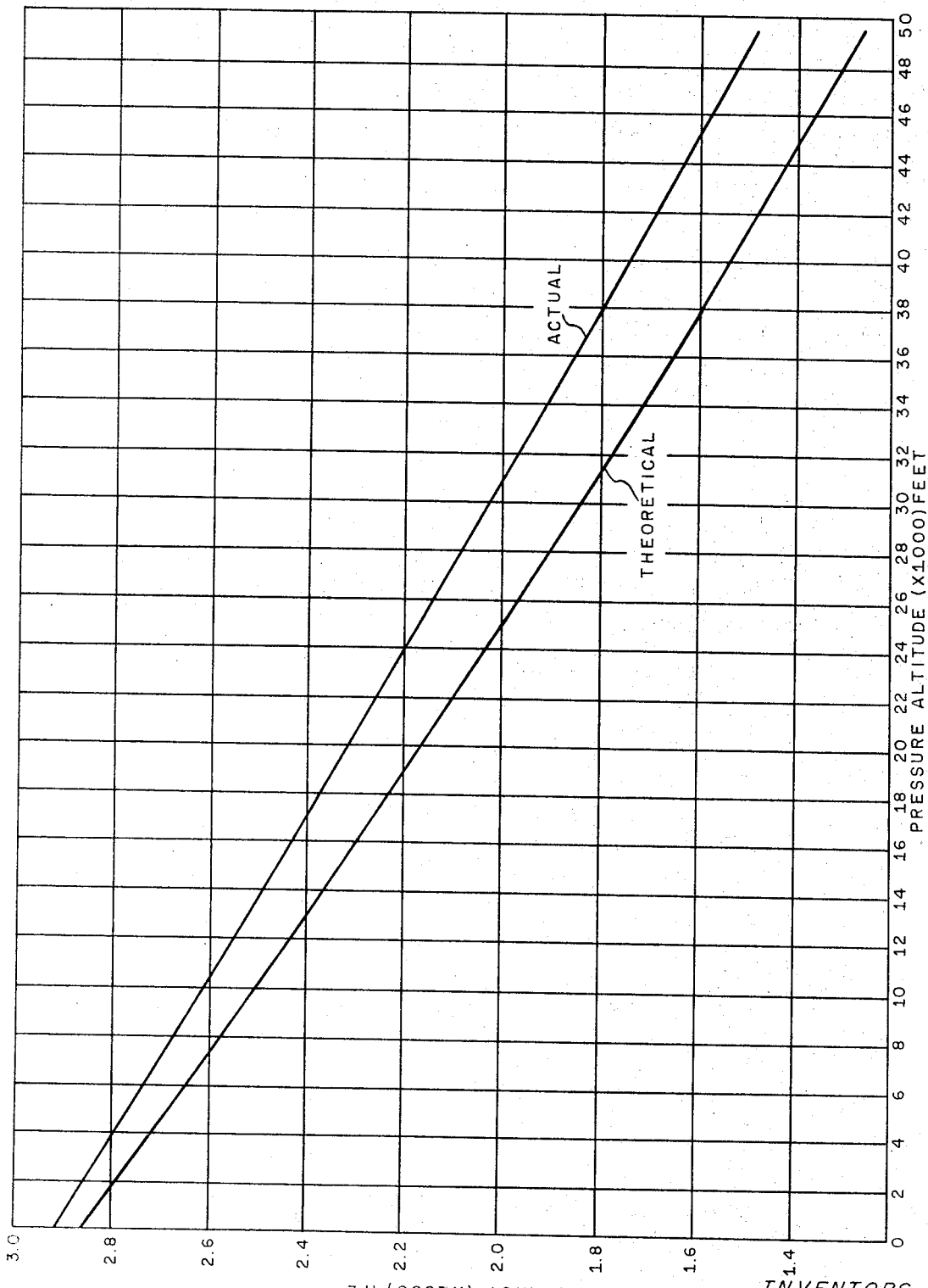
FIG. 4 is a graph of frequency versus pressure altitude obtained from an altitude computer incorporating the invention.

The magnitudes of parameters from a manufactured sensor were substituted in the above equations and evaluated by a computer run. A plot of pressure altitude versus frequency was obtained and is shown by the theoretical curve in FIG. 4. The data obtained from an actual test of the manufactured sensor using a manometer is shown by the actual curve in FIG. 4. As shown by these curves, the pressure altitude versus frequency characteristic of the sensor is substantially linear over normal operating ranges of aircraft.

Figure 5:
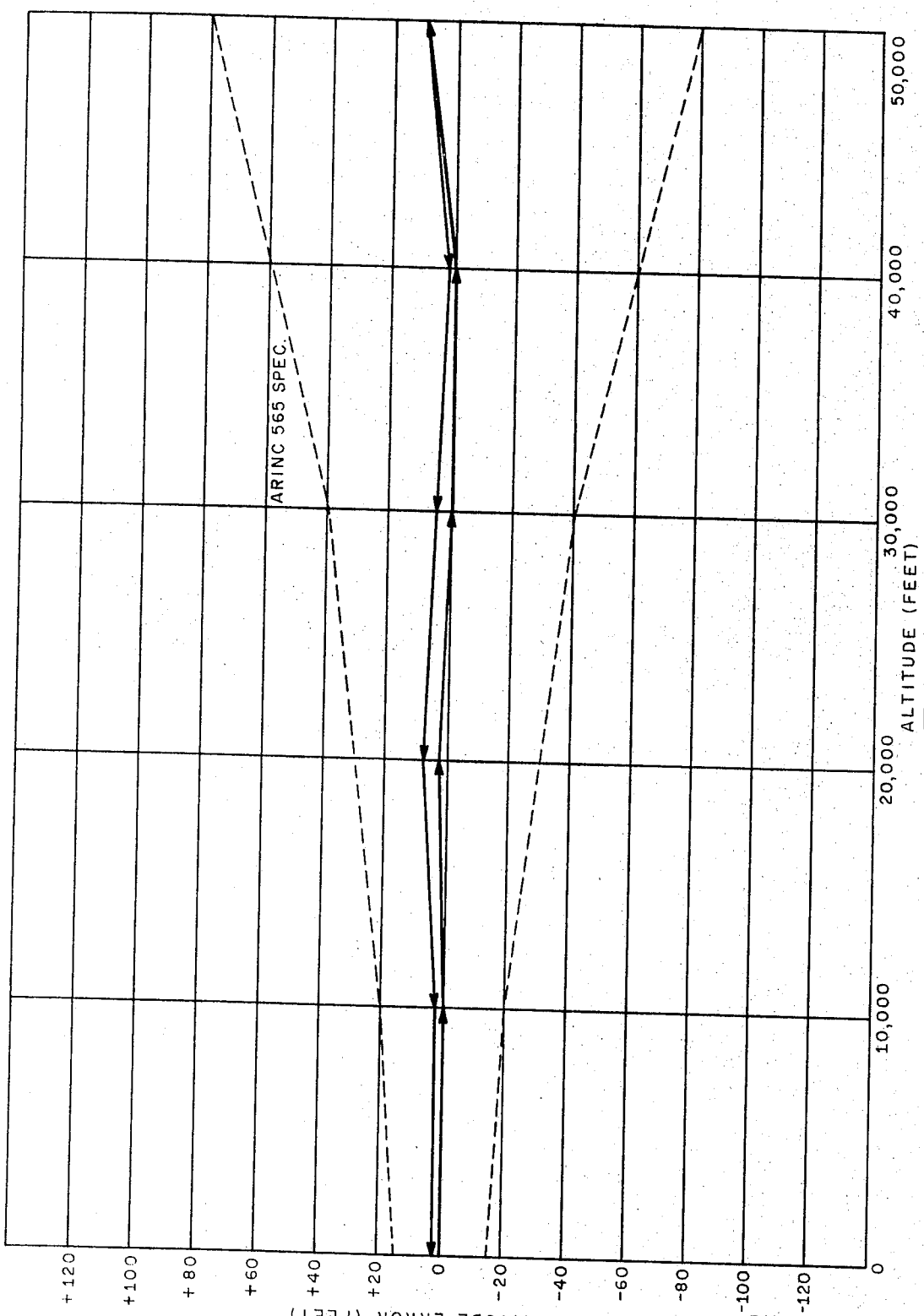
FIG. 5 is a graph of error versus pressure altitude obtained from an altitude computer incorporating the invention.

The error in feet of the sensor over the same range as the actual test is shown by the connected arrows in the graph of FIG. 5. The ARINC 565 specification for allowable error over this operating range is shown in dashed lines. This specification is accepted as the industry performance standard for this type of aircraft equipment.

The frequency to d.c. converter 12 is a solid state precision frequency converter having a linear transfer characteristic which includes the shaping and limiter circuit 13 that receives the variable frequency output signal from the vibrating sensing unit 11. The limiter 13 passes all values of the received variable frequency signal between predetermined maximum and minimum values and maintains the output signal within these values when they are exceeded by the received signal. As a result, the limiter 13 produces a varying frequency square wave output signal shown at (a) in FIG. 1 which is differentiated in the capacitor 14 and resistor 15 combination producing the positive and negative differentiated pulses shown at (b). The diode 16 and the negatively biased resistor 17 clip the negative differentiated pulses providing only the positive differentiated pulses shown at (c) as inputs to the monostable multivibrator 20. The positive input pulses turn on the normally non-conducting transistor 21 which causes the voltage at the collector of transistor 21 to become negative. The capacitor 22 couples the negative voltage to the base of transistor 23 which switches off transistor 23. As shown by the waveform (d) in FIG. 1, the voltage at the base of transistor 23 then increases in a positive direction at a rate controlled by the time constant of the capacitor 22 and the resistor 24 until the transistor 23 is switched on again completing the cycle. The output pulses of the multivibrator 20 have a constant width approximately equal in duration to seven tenths of the product of the capacitor 22 and the resistor 24 ($.7R_1C_1$) as shown at (e). These output pulses are then integrated by the resistor 25 and the capacitor 26 to produce a direct current output voltage $Eo$ as shown in FIG. 1 which is proportional to the frequency of the input signal from the shaping and limiter circuit 13. As is well known in the art there are many frequency-to-voltage converters which will function as desired in this combination of which the foregoing converter 12 is merely exemplary.

The variable amplitude d.c. output voltage is applied to the first input terminal on the summing element 31 of the displacement servo 30. The second input terminal on the summing element 31 receives a d.c. voltage from the feedback potentiometer 32 which is representative of the present altitude of the aircraft. When the aircraft pressure altitude is changed, the output terminal of the summing element 31 will present a difference error signal which will be coupled through the amplifier 33 thereby providing a d.c. control voltage to the d.c. motor 34. In response to the d.c. control voltage, the armature of the motor 34 will rotate varying the angular position of the variable gain gear train 35. The rotors of the coarse synchro 36 and the fine synchro 37 will rotate in response to the rotation of the gear train 35 and produce precise electrical output signals indicative of the new altitude position of the aircraft. Simultaneously, the wiper arm of the feedback potentiometer 32 which is also coupled to the gear train 35 will be rotated generating a new value of feedback voltage that is applied to the second input terminal of the summing element 31.

The gear train 35 utilizes anti-backlash springs to insure precise positioning by allowing continuous gear loading in only one direction. In addition, the torques in the gear train 35 are maintained at a low level thereby reducing the stress levels and minimizing the displacement errors.

The calibration potentiometer 40 provides a small standoff signal which is a function of altitude and is varied by the rotation of the gear train 35. Trim potentiometers enable an initial setting of the calibration potentiometer 40 and control its output thereby providing final calibration of the computer and also compensating any small altitude errors accumulated throughout the altitude computer 10.

The thermal compensation network 41 receives the electrical signal indicative of temperature variations within the sensor unit 45 provided by the thermistor 55 of FIG. 2 and generates a low level error signal that is applied to the input of the amplifier 33. This low level error signal is proportional to the temperature characteristics of the altitude computer 10.

While the invention has been described in a preferred embodiment, it is to be understood that the words which have been used are words of description rather than limitation and that changes may be made within the purview of the appended claims without departing from the true scope and spirit of the invention in its broader aspects.

We claim:
1. An aircraft altitude computer comprising
   sensing means including a variable frequency oscillator coupled to an electrical driving circuit that vibrates a sensitive diaphragm which is responsive to changes in static pressure, said sensing means having a substantially linear transfer characteristic of vibrating frequency versus pressure altitude for producing an electrical output signal that varies in frequency in a substantially linear manner for changes in pressure altitude, converting means having a linear transfer characteristic of variable frequency input versus amplitude of voltage output coupled to said sensing means for transforming said variable frequency electrical output signal into a variable amplitude voltage, displacement servo means coupled to said converter means for providing an output shaft angle displacement in response to said variable amplitude direct current voltage, and transducer means responsive to said output shaft angle displacement for producing electrical output signals respresentative of said changes in pressure altitude.

2. An aircraft altitude computer as recited in claim 1 in which said sensing means includes an enclosure which contains a sensitive diaphragm secured to said enclosure at its peripheral edge for sub-dividing said enclosure into a first compartment having means for receiving a fluid at static pressure and a second compartment having means for maintaining a reference vacuum pressure, electrical driving means associated with said diaphragm for vibrating said diaphragm at its resonant frequency which varies in accordance with the value of said static pressure at respective pressure altitudes, and variable frequency oscillator means coupled to said driving means, said driving means forming in part the tuning circuit for said oscillator means and receiving the current output of said oscillator means in closed loop fashion for producing an electrical output signal that varies in frequency in a substantially linear manner for changes in said pressure altitude.

3. An altitude computer as recited in claim 2 in which said converter means includes a frequency to voltage converter coupled to said oscillator means for producing a variable amplitude output direct current voltage that is a substantially linear function of said changes in pressure altitude.

4. An altitude computer as recited in claim 1 in which said displacement servo means includes a summing element having a first input terminal connected to said converter means and a second input terminal connected to a feed back potentiometer for providing a difference error signal in accordance with said variable amplitude output voltage.

5. An altitude computer as recited in claim 1 in which said displacement servo means includes a motor for providing an output shaft angle displacement and said transducer means includes synchros responsive to said output shaft angle displacement for producing electrical signals representative of said changes in pressure altitude.

6. An altitude computer as described in claim 5 in which said transducer means includes coarse and fine synchros for providing electrical output signals representative of said changes in pressure altitude.

7. An altitude computer as recited in claim 5 in which said displacement servo means further includes a summing element, an amplifier, a direct current motor and a gear train connected in series and a feedback potentiometer positioned by said gear train to provide a feedback voltage to said summing element that represents the position of said gear train.

* * * * *